United States Patent
Kwak et al.

[11] Patent Number: 6,166,781
[45] Date of Patent: Dec. 26, 2000

[54] NON-LINEAR CHARACTERISTIC CORRECTION APPARATUS AND METHOD THEREFOR

[75] Inventors: Mal-seob Kwak, Kyungki-do; Jun Sunwoo; In-jun Hwang, both of Seoul; Bong-soon Kang, Kyungki-do, all of Rep. of Korea

[73] Assignee: Samsung Electronics Co., Ltd., Kyungki-do, Rep. of Korea

[21] Appl. No.: 08/943,982

[22] Filed: Oct. 3, 1997

[30] Foreign Application Priority Data

| Oct. 4, 1996 | [KR] | Rep. of Korea | 96-43997 |
| Mar. 31, 1997 | [KR] | Rep. of Korea | 97-11822 |
| Aug. 8, 1997 | [KR] | Rep. of Korea | 97-37986 |

[51] Int. Cl.$^7$ ............................. H04N 5/202; G03F 3/08
[52] U.S. Cl. .......................... 348/674; 348/674; 348/676; 348/677; 348/254; 358/519; 358/518; 358/521; 358/522
[58] Field of Search ...................... 348/674, 675, 348/676, 254, 677; 382/254, 274; 358/518, 519, 521–23

[56] References Cited

U.S. PATENT DOCUMENTS

| 5,065,234 | 11/1991 | Hung et al. | 358/80 |
| 5,175,621 | 12/1992 | Maesato | 358/164 |
| 5,196,924 | 3/1993 | Lumelsky et al. | 358/32 |
| 5,282,036 | 1/1994 | Worley, Jr. et al. | 358/164 |
| 5,398,076 | 3/1995 | Lum et al. | 348/676 |
| 5,408,267 | 4/1995 | Main | 348/254 |
| 5,706,058 | 1/1998 | Okada | 348/674 |

OTHER PUBLICATIONS

Japanese Patent Publication No. JP 6–233131; Asano Masanari (Inventor); Gamma Correction for Digital Image; Fuji Film Micro Device KK; 9 pages.

Japanese Patent Publication No. JP 8214191; Suzuki Susumu (Inventor); Nonlinear Processing Circuit; Fujitsu General Ltd.; 8 pages.

*Primary Examiner*—John K. Peng
*Assistant Examiner*—Paulos Natnael
*Attorney, Agent, or Firm*—Skjerven Morrill MacPherson LLP; David T. Millers

[57] ABSTRACT

A non-linear response correction apparatus and method reduce look up table size and output error. In one embodiment, a range of an N-bit input signal is split into two or more sectors, based on a gradient of a non-linear correction curve and an allowable error, and then a N-bit input signal is divided into U upper bits and D lower bits where U and D depend on which sector contains the input signal. First and second look up tables read first and second data stored therein, respectively, using the upper bits of the digital signal as an address. The first data is the difference between a corrected signal and the input signal, and the second data is the gradient of the corrected signal with respect to the gradient of the input signal. The second data read from the second look up table is multiplied by the lower bits, and the first data read from the first look up table is added to the upper bits. The sum is added to the product to produce an N-bit digital corrected signal that compensates for the non-linear characteristics.

46 Claims, 8 Drawing Sheets

NON-LINEAR CHARACTERISTIC CORRECTION APPARATUS AND METHOD THEREFOR

BACKGROUND OF THE INVENTION

1. Field of the Invention

The present invention relates to systems having non-linear characteristics such as gamma characteristics, and more particularly, to an apparatus and method for converting input data so that a system having a non-linear response generates output that is linearly related to the input data.

2. Description of the Related Art

In general, many systems exhibit some type of non-linear characteristics or responses. Particularly, many home appliances, computers, and communication systems, which are familiar in our daily life, have non-linear characteristics. For example, t display device, such as a cathode ray tube (CRT) in a television (TV) or a computer monitor, or a charge coupled device (CCD) in a camera, shows a gamma intensity distribution caused by non-linearity of phosphorescence in the device. In a CRT, the gamma characteristics cause output brightness to have a non-linear relationship with an input luminance signal. This can distort the image on the CRT if the input signal is generated under the assumption of a linear response. Thus, it is necessary to apply gamma correction such input signals to ensure a linear relationship between the input signal and the output luminance.

FIG. 1 is a graph illustrating gamma correction for a CRT of a TV. Here, the X-axis represents the normalized voltage of a video signal input to the CRT, and the Y-axis represents the normalized intensity of the light emitted from the CRT. If the input voltage of the CRT and the intensity of the emitted light are normalized, the CRT has non-linear characteristics 14 as shown in FIG. 1. According to the CRT characteristics, the CRT response is weak for a small input signal and stronger when a large input signal. The intensity (Y) of the emitted light with respect to the input voltage (X) to the CRT is expressed exponentially as in Equation 1.

$$Y = X^{2.2} \qquad \text{Equation 1}$$

If a gamma-corrected signal 10, which is obtained by gamma-correcting a linear video signal 12, is input, the CRT emits the light having intensity proportional to the original video signal 12.

A gamma correction apparatus is required when the data to be input to a display device requires compensation for the gamma characteristics of the display device. A conventional gamma correction apparatus uses a look up table stored in a memory such as a RAM or ROM. Here, the look up table contains gamma corrected values previously stored at addresses corresponding to the associated input values, and in place of each input digital value, the look up table outputs to the display device the gamma corrected value read using the input digital value as a memory address.

Look up tables for gamma correction become larger as the range of input data values increases. For example, a look up table for a conventional gamma correction apparatus that corrects an N-bit digital input signal is $2^N \cdot W$, where $2^N$ is the depth of the look up table and W is the width of the look up table. Larger look up tables make integration more difficult and increases system costs. In addition, a programmable system for gamma correction typically uses RAM such as SRAM or DRAM for the look up table, instead of ROM. However, RAM is typically more complicated and larger than ROM, making look up table size even more critical in programmable systems.

SUMMARY OF THE INVENTION

A first object of the invention is to reduce the depth of the look up table required in an apparatus for correcting non-linear characteristics.

A second object of the invention is to reduce the width of the look up table in an apparatus for correcting non-linear characteristics.

A third object of the invention is to reduce errors introduced when correcting non-linear characteristics, while still reducing the depth of the look up table of an apparatus for correcting non-linear characteristics.

A fourth object of the invention is to reduce errors introduced when correcting non-linear characteristics, while still reducing the depth and width of the look up table of an apparatus for correcting non-linear characteristics.

A fifth object of the invention is to provide a method for correcting non-linear characteristics, using the apparatus of the third object.

A sixth object of the invention is to provide a method for correcting non-linear characteristics, using the apparatus of the fourth object.

To achieve the first object, an apparatus for correcting non-linear characteristics of a system includes: a first look up table for storing first data and outputting the stored first data by using the upper bits of an N-bit digital signal input to the system as an address; a second look up table for storing second data and outputting the stored second data by using the upper bits of the digital signal as an address; a multiplier for multiplying the second data, output from the second look up table, by the lower bits of the digital signal, and outputting the product; and an adder for adding the first data, output from the first look up table, to the product output from the multiplier. The sum output by the adder is an N-bit digital corrected signal for compensating for the non-linear characteristics, used by the system instead of the N-bit digital signal. The first data is a predetermined number of digital corrected signals, and the second data is the gradient of the digital corrected signal with respect to the gradient of the digital signal.

To achieve the second object, an apparatus for correcting non-linear characteristics of a system includes: a first look up table for storing first data and outputting the stored first data by using the upper bits of an N-bit digital signal input to the system as an address; a second look up table for storing second data and outputting the stored second data by using the upper bits of the digital signal as an address; a multiplier for multiplying the second data, output from the second look up table, by the lower bits of the digital signal, and outputting the product; a first adder for adding the first data, output from the first look up table, to the upper bits of the digital signal, and outputting the sum; and a second adder for adding the output from the multiplier to the output from the first adder. The sum output by the second adder is an N-bit digital corrected signal for compensating for the non-linear characteristics, used by the system instead of the N-bit digital signal. The first data is the difference between the digital corrected signal and the digital signal, and the second data is the gradient of the digital corrected signal with respect to the gradient of the digital signal.

To achieve the third object, an apparatus for correcting non-linear characteristics of a system includes: a sector classifier for classifying range of an N-bit digital signal into two or more sectors, based on a predetermined gradient and a predetermined allowable error, and outputting a control signal indicating the respective sectors; a bit divider for dividing the N-bit digital signal into upper and lower bits in response to the control signal; a first look up table for storing first data and outputting the stored first data by using the upper bits as an address; a second look up table for storing second data and outputting the stored second data by using the upper bits as an address; a multiplier for multiplying the second data, output from the second look up table, by the lower bits, and outputting the product; and an adder for adding the first data, output from the first look up table, to the product output from the multiplier. The sum output by the adder is an N-bit digital corrected signal for compensating for the non-linear characteristics, used by the system instead of the N-bit digital signal. The first data is a predetermined number of digital corrected signals. The second data is the gradient of the digital corrected signal with respect to the gradient of the digital signal, and the control signal is generated such that more bits of the digital signal are allocated as upper bits, in a sector having a steeper gradient.

To achieve the fourth object, an apparatus for correcting non-linear characteristics of a system includes: a sector classifier for classifying range of an N-bit digital signal into two or more sectors, based on a predetermined gradient and a predetermined allowable error, and outputting a control signal indicating the respective sectors; a bit divider for dividing the N-bit digital signal into upper and lower bits in response to the control signal; a first look up table for storing first data and outputting the stored first data by using the upper bits as an address; a second look up table for storing second data and outputting the stored second data by using the upper bits as an address; a multiplier for multiplying the second data, output from the second look up table, by the lower bits, and outputting the product; a first adder for adding the first data, output from the first look up table, to the upper bits, and outputting the sum; and a second adder for adding the output from the multiplier to the output from the first adder. The sum output by the adder is an N-bit digital corrected signal for compensating for the non-linear characteristics, used by the system instead of the N-bit digital signal. The first data is the difference between the digital corrected signal and the digital signal, and the second data is the gradient of the digital corrected signal with respect to the gradient of the digital signal. The control signal is generated such that more bits of the digital signal are allocated as upper bits, in a sector having a steeper gradient.

To achieve the fifth object, a method for correcting non-linear characteristics of a system, using look up tables, the method includes: (a) setting a predetermined gradient and a predetermined allowable error; (b) classifying range of an N-bit digital signal by sector, based on the predetermined gradient and the predetermined allowable error; (c) dividing the N-bit digital signal into upper and lower bits, according to the gradient of the sector including the current digital signal to be corrected, and the predetermined allowable error; (d) reading the first and second data stored in a look up table, according to the upper bits; (e) multiplying the second data by the lower bits; and (f) adding the first data to the product of the multiplication, wherein the sum of the addition is an N-bit digital corrected signal for compensating for the non-linear characteristics, used by the system instead of the N-bit digital signal, and the first data is a predetermined number of digital corrected signals, and the second data is the gradient of the digital corrected signal with respect to the gradient of the digital signal, and the control signal is generated such that more bits of the digital signal are allocated as upper bits in a sector having a steeper gradient.

To achieve the sixth object, a method for correcting non-linear characteristics of a system, using look up tables, the method includes: (a) setting a predetermined gradient and a predetermined allowable error; (b) classifying range of an N-bit digital signal by sector, based on the predetermined gradient and the predetermined allowable error; (c) dividing the N-bit digital signal into upper and lower bits, according to the gradient of the sector including the current digital signal to be corrected, and the predetermined allowable error; (d) reading the first and second data stored in a look up table, according to the upper bits; (e) multiplying the second data by the lower bits; (f) adding the first data to the upper bits; and (g) adding the sum of the addition of step (f) to the product of the multiplication. The sum of the addition of step (g) is an N-bit digital corrected signal for compensating for the non-linear characteristics, used by the system instead of the N-bit digital signal. The first data is the difference between the digital corrected signal and the digital signal, and the second data is the gradient of the digital corrected signal with respect to the gradient of the digital signal. The control signal is generated such that more bits of the digital signal are allocated as upper bits in a sector having a steeper gradient.

BRIEF DESCRIPTION OF THE DRAWINGS

The above objects and advantages of the invention will become more apparent by describing in detail preferred embodiments of the invention with reference to the attached drawings in which.

DESCRIPTION OF THE PREFERRED EMBODIMENTS

Figure 1:
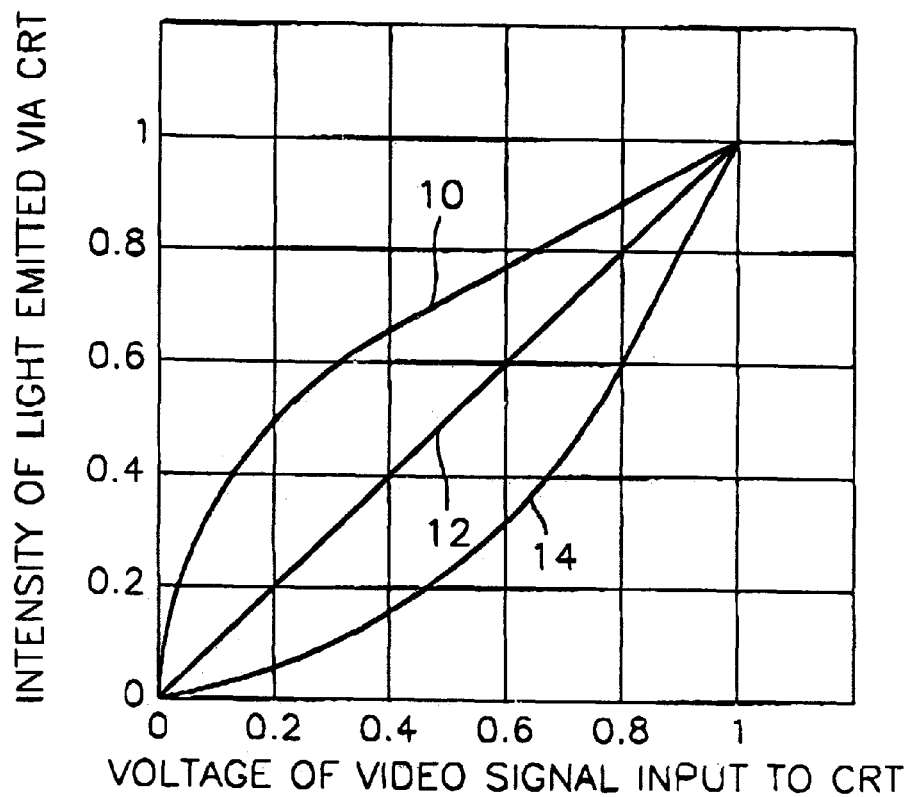
FIG. 1 is a graph illustrating gamma correction for a cathode ray tube (CRT) of a television (TV)
Figure 2:
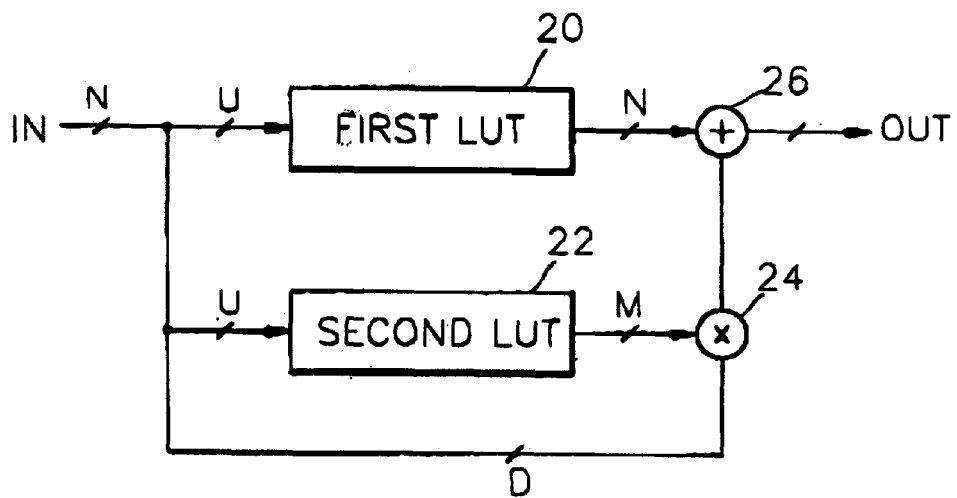
FIG. 2 is a block diagram of an apparatus for correcting non-linear characteristics according to an embodiment of the invention.

Referring to FIG. 2, a non-linear characteristic correction apparatus according to an embodiment of the invention includes a first look up table (LUT) 20, a second LUT 22, a multiplier 24, and an adder 26. An N-bit digital signal is input via an input port IN. The first LUT 20 stores first data, and reads the stored data using U upper bits (i.e., most significant bits) of the N-bit digital input signal as an address. Here, U is a number o f upper bits of the digital input signal and is less than N. The first data is corrected digital signals, each of which corresponds to one of $2^U$ address values which are possible upper bits of the $2^N$ possible values of the N-bit digital signal. Each of the $2^U$ possible address values corresponds to an equal portion of the range (from 0 to $2^{N-1}$) of the N-bit digital input signal that can be input via the input port IN. Thus, each of $2^U$ address values corresponds to $2^D$ input values, where D=N–U. The second look up table 22 stores second data, and reads the stored data using the U upper bits of the N-bit digital input signal as an address. Here, the second data is the rate of change of the digital corrected signals with respect to the rate of change of the digital input signals to be input via the input port IN.

Multiplier 24 multiplies the M-bit second data, (here, M is varied according to the allowable error) read from the second look up table 22, with the D lower bits (i.e., least significant bits) of the N-bit digital input signal, and outputs the product to adder 26. Adder 26 adds the output from multiplier 24 to the first data read from first LUT 20, and outputs the sum to an output port OUT as the N-bit digital corrected signal for compensating for the non-linear characteristics of the system.

The non-linear characteristic correction apparatus shown in FIG. 2 may be used for gamma correction. Also, the N-bit digital input signal input via input port IN may be one of a red (R), green (G) and blue (B) color signals for a cathode ray tube (CRT). In such application, the non-linear correction apparatus acts as a gamma correction apparatus, and outputs the digital corrected color signal, obtained from the digital input color signal, to the CRT via the output port OUT.

The non-linear characteristic correction apparatus of FIG. 2 may further include multiplexers and demultiplexers which are controlled by a system clock or divided system clocks, to concurrently perform the gamma correction of the R, G, and B color signals.

Figure 3:
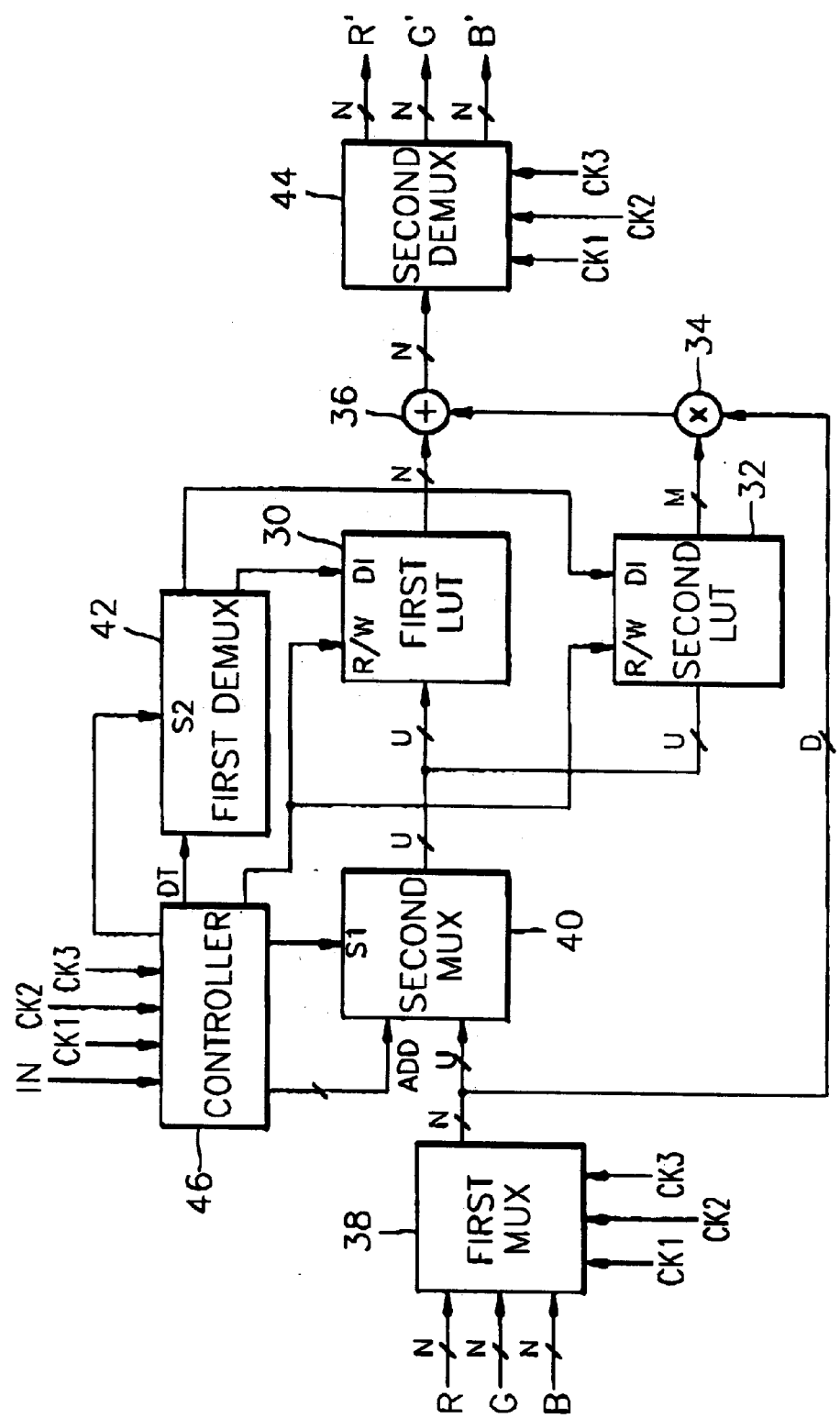
FIG. 3 is a block diagram of a gamma correction apparatus to which the non-linear characteristic correction apparatus shown in FIG. 2 is applied.

FIG. 3 is a block diagram of a gamma correction apparatus. The gamma correction apparatus includes a first LUT 30, a second LUT 32, a multiplier 34, an adder 36, a first multiplexer (MUX) 38, a second MUX 40, a first demultiplexer (DEMUX) 42, a second DEMUX 44, and a controller 46.

Figure 4:
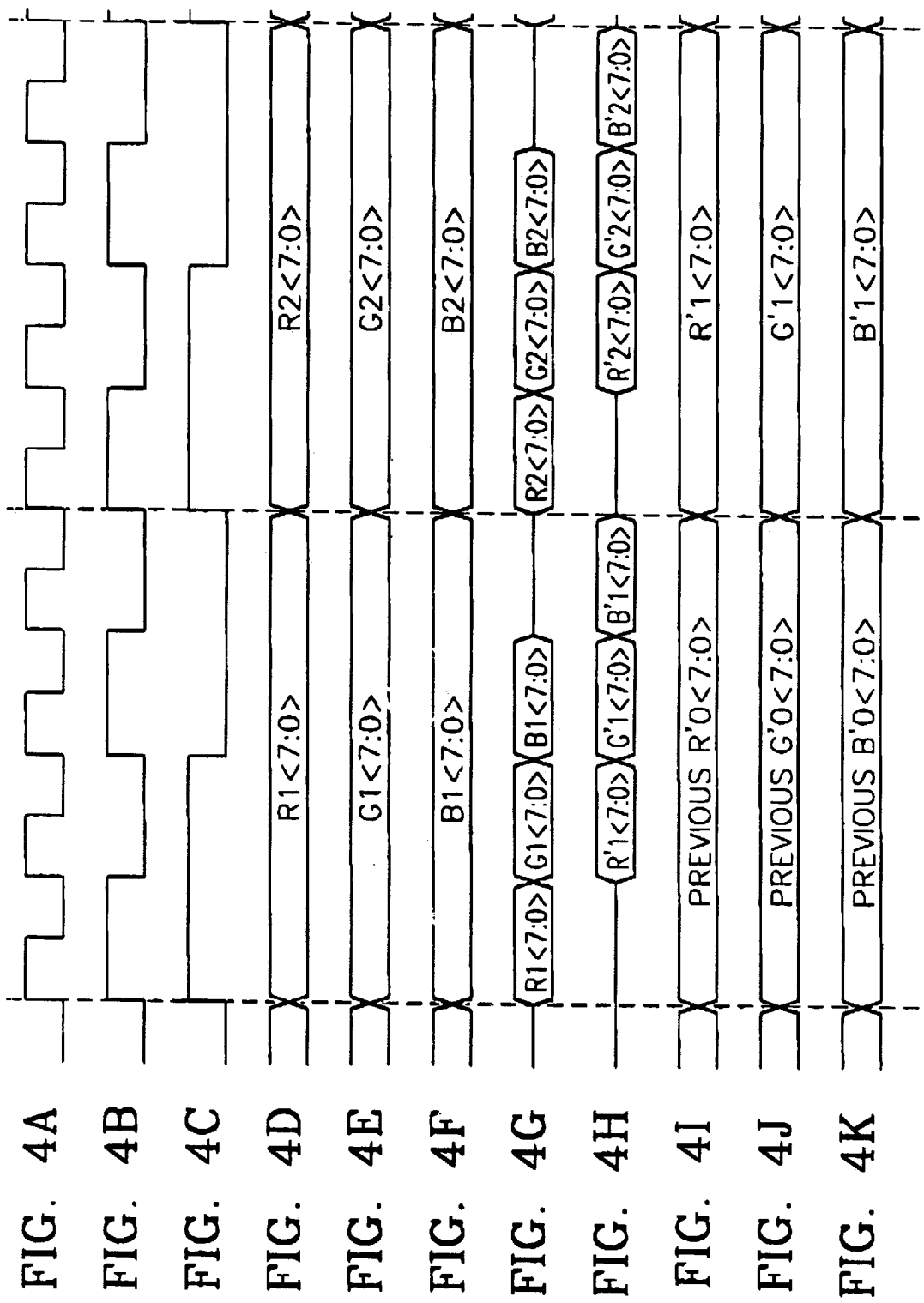
FIGS. 4A through 4K represent waveforms of signals within the gamma correction apparatus of FIG. 3.

FIGS. 4A through 4K are waveforms of signals within the gamma correction apparatus of FIG. 3. Here, input R, G, and B color signals are all 8-bit signals. FIG. 4A is the waveform of a first clock signal CK1. FIG. 4B is the waveform of a second clock signal CK2. FIG. 4C is the waveform of a third clock signal CK3. FIGS. 4D, 4E and 4F are the waveforms of input R, G, and B color signals. FIG. 4G is the waveform of a signal output from the first MUX 38. FIG. 4H is the waveform of a signal input to second DEMUX 44, and FIGS. 4I, 4J and 4K are the waveforms of R', G', and B' color signals output from the second DEMUX 44.

First MUX 38 of FIG. 3 begins receiving three N-bit R, G, and 3 color signals respectively shown in FIGS. 4D, 4E and 4F in response to third clock signal CK3 of FIG. 4C, selects one of the input R, G, and B color signals in response to first clock signal CK1 of FIG. 4A, and outputs the U upper bits of the selected data to second MUX 40, and outputs the D lower bits of the selected data to multiplier 34. Second MUX 40 selectively outputs either address ADD output from the controller 46 or N-bit data output from first MUX 38, in response to the selection signal input from controller 46 to a selection port S1. Here, if R, G, and B color signals of FIGS. 4D, 4E and 4F are generated in a system complying with the CCIR601 standard, the frequencies of the first, second and third clocks CK1, CK2 and CK3 are 54 MHz, 27 MHz and 13.5 MHz, respectively.

On the other hand, first and second LUTs 30 and 32 store the first and second data, respectively, which are the same as the data stored in first and second LUTs 20 and 22 of FIG. 2, and output the stored first and second data to adder 36 and multiplier 34, respectively, in response to the U upper bits of the data of FIG. 4G which are input via second MUX 40.

Multiplier 34 multiplies the second data output from second LUT 32 with lower bits D of the data shown in FIG. 4G output from first MUX 38, and outputs the product to adder 36. Adder 36 adds the output from multiplier 34 to the first data output from first LUT 30, and outputs the sum shown in FIG. 4H to second DEMUX 44. Second DEMUX 44 receives the N-bit gamma-corrected color signal of FIG. 4H in response to third clock signal CK3, and outputs three N-bit gamma-corrected R', G', and B' color signals of FICr. 41, 4J and 4K in response to third clock signal CK3.

On the other hand, the addressing method of first or second LUT 20 or 22 of FIG. 2 can be programmable. Such programmable operation is described with reference to FIG. 3. In this case, first and second LUTs 30 and 32 shown in FIG. 3 are formed of a RAM instead of ROM. Also, controller 46 receives data to be written in first and second look up tables 30 and 32 and various control signals from a microprocessor (not shown) via the input port IN, and writes the data in first and second look up tables 30 and 32 according to the input control signals.

In order to write external data to first and second LUTs 30 and 32, controller 46 of FIG. 3 outputs a selection signal such that second MUX 40 selects one of the addresses, and outputs the selected address to first and second LUTs 30 and 32. Also, first DEMUX 42 receives the first or second data DT output from controller 46, and output, the first or second data to first or second LUT 30 or 32, in response to a selection signal from controller 46 via a selection port S2. Thus, first and second LUTs 30 and 32 can store the first and second data output from first DEMUX 42 at addresses of first and second LUTs 30 and 32, in response to a write/read control signal which controller 46 applies to a write/read port R/W.

Next, in order to read the first and second data stored in first and second LUTs 30 and 32, second MUX 40 selects the U upper bits of the data output from first MUX 38 in response to a selection signal, and outputs the selected upper bits as addresses of first and second LUTs 30 and 32. Here, first and second LUTs 30 and 32 read and output the stored first and second data in response to a write/read control signal from the controller 46, using the U upper bits as addresses.

In the above-described operation, controller 46 outputs selection signals for controlling second MUX 40 and first DEMUX 42, and externally input data DT and address ADD, in response to first, second and third clock signals CK1, CK2 and CK3. First MUX 38 multiplexes and second DEMUX 44 demultiplexes, using a time sharing method.

The sizes of first and second LUTs 30 and 32 shown in FIG. 3 are $2^U \cdot W$, where W is the data width of the first or second data. This is smaller than the size $2^N \cdot W$ of the LUTs used for the conventional non-linear characteristic correction apparatus.

As well as in a gamma correction apparatus, the non-linear characteristic correction apparatus according to the embodiments of the invention shown in FIGS. 2 and 3 may also be included in a transmitter for transmitting digital input signals and digital input color signals, and in a receiver for receiving the digital input signals and the digital input color signals.

Figure 5:
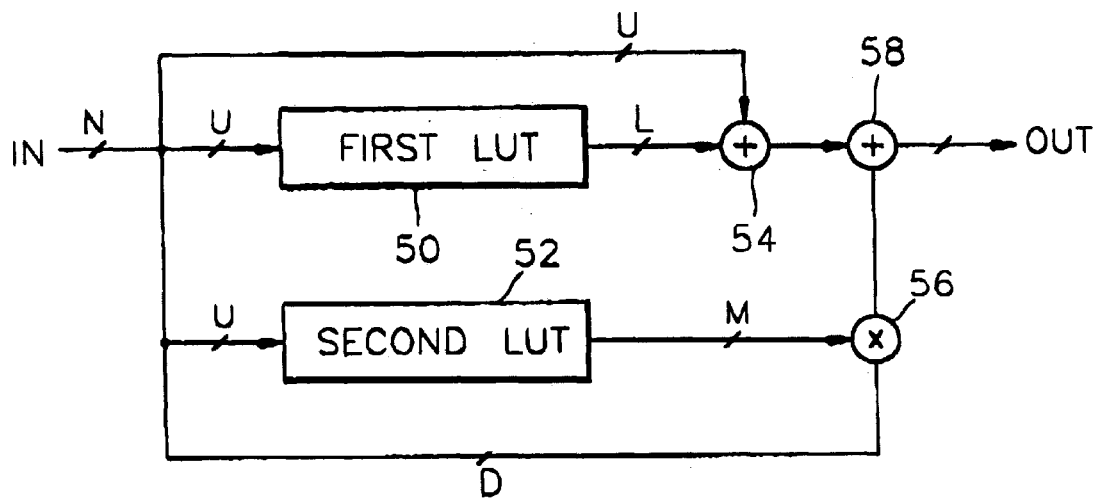
FIG. 5 is a block diagram of a non-linear characteristic correction apparatus according to another embodiment of the invention.

FIG. 5 is a block diagram of a non-linear characteristic correction apparatus according to another embodiment of the invention. The non-linear characteristic correction apparatus of FIG. 5 includes first and second LUTs 50 and 52, a multiplier 56, and first and second adders 54 and 58.

First LUT 50 of FIG. 5 stores L-bit third data (here, L is less than N), and outputs the stored third data to the first adder 54, using as an address the U upper bits of the N-bit digital input signal input via an input port IN. Here, the third data is the differences between "seeds" and each input signal corresponding to the corrected signal. The seeds are the values of the digital corrected signal, which each correspond to one of $2^U$ digital input signals which are spaced equidistantly throughout the range of the N-bit digital input signals to be input via the input port IN. For example, the seeds are the difference between a corrected value and an input value have U upper bits equal to the address signal for LUT 50 and D lower bits equal to zeros. Second LUT 52 stores the above-described second data, and outputs the stored second data to multiplier 56 using as an address the U upper bits of the N-bit digital signal input via the input port IN.

Multiplier 56 multiplies the second data output from the second LUT 52 and the D lower bits of the N-bit digital input signal, and outputs the product to second adder 58. First adder 54 adds the output from first LUT 50 to the U upper bits of the N-bit digital input data, and outputs the sum to second adder 58. The least significant bits of the output sum from adder 58 may be padded with zeros (e.g., to provide an N-bit signal) for the addition by adder 58. Second adder 58 adds the output from multiplier 56 to the output from first adder 54, and outputs the sum to an output port OUT as a digital corrected signal. Thus, the digital corrected signal can compensate for the non-linear characteristics of a system.

Figure 6:
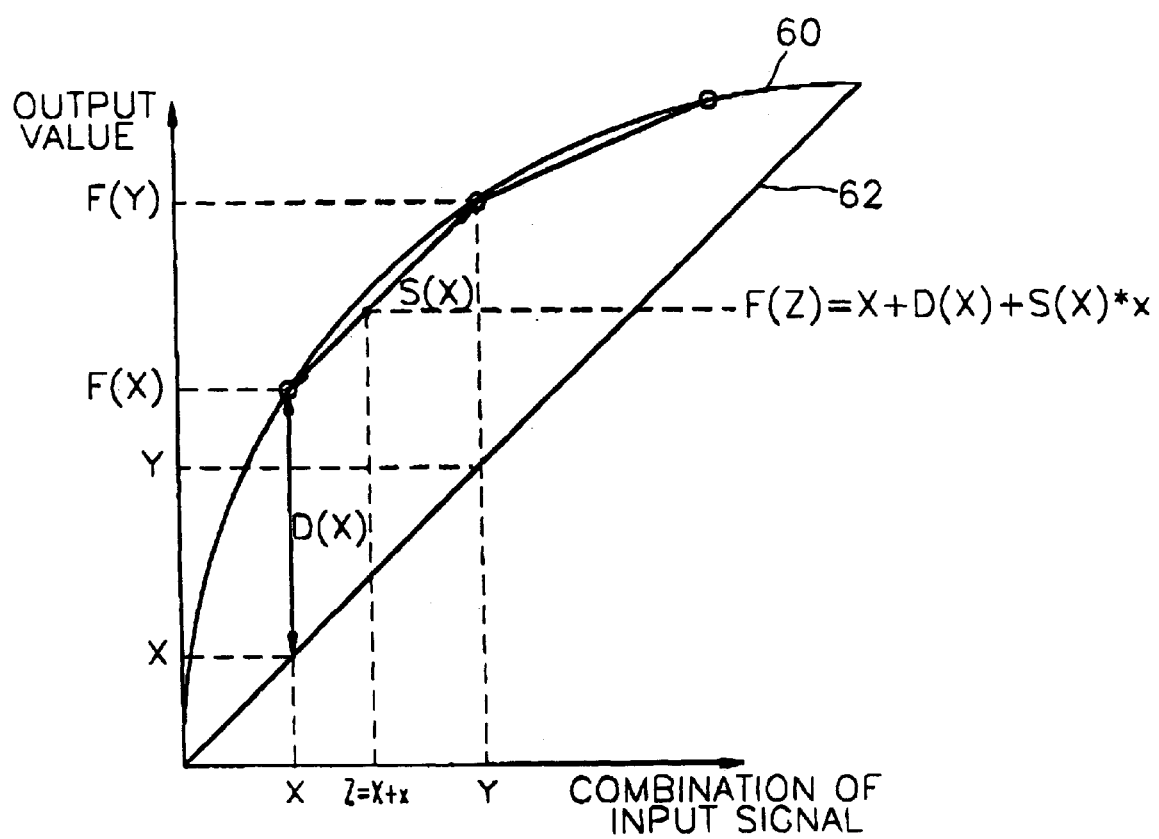
FIG. 6 is a graph illustrating the operation of the non-linear characteristic correction apparatus of FIG. 5.

FIG. 6 is a graph illustrating the operation of the non-linear characteristic correction apparatus of FIG. 5 to obtain a digital corrected signal with respect to an arbitrary digital input signal using the third and second data. In FIG. 6, the X-axis represents a digital input signal and the Y-axis represents an output value. The line indicated by reference numeral 62 shows input-output characteristics of the linear digital input signal whose gradient is equal to "1", and the line indicated by reference numeral 60 represents a compensation curve for compensating for the non-linear characteristics of an arbitrary system.

Referring to FIG. 6, the difference D(X) between a digital input signal and its seed value F(X) is stored in first LUT 50 of FIG. 5 as the third data, while first LUT of FIG. 2 stores only seed values F(X) as first data. Second LUT 52 of FIG. 5, like the second LUT 22 of FIG. 2, stores a gradient (or slope) S(X), which is the rate of deviation from the seed value F(X) with respect to the rate of change of the digital input signal Z, as the second data. Here, if an N-bit digital input signal Z composed of upper bits X and lower bits x shown in FIG. 6 is input via the input port IN of FIG. 5, the corrected value F(Z) with respect to the digital input signal Z is calculated by interpolation. That is, first and second LUTs 50 and 52 output the stored difference D(X) and the gradient S(X) to first adder 54 and multiplier 56, respectively, using upper bits X as addresses. Thus, the corrected value F(Z) with respect to the digital input signal Z is calculated using Equation (2), and then output to an output port OUT.

$$F(Z)=X+D(X)+S(X)*x \qquad \text{Equation 2}$$

An advantage of the non-linear characteristic correction apparatus of FIG. 5 is that first LUT 50 stores the third data instead of the first data, and the width of first LUT 50 can be reduced since differences D(x) is generally smaller than seeds F(X). Thus, the non-linear characteristic correction apparatus of FIG. 5 requires smaller memory/hardware than the apparatus of FIG. 2 or 3.

Figure 7:
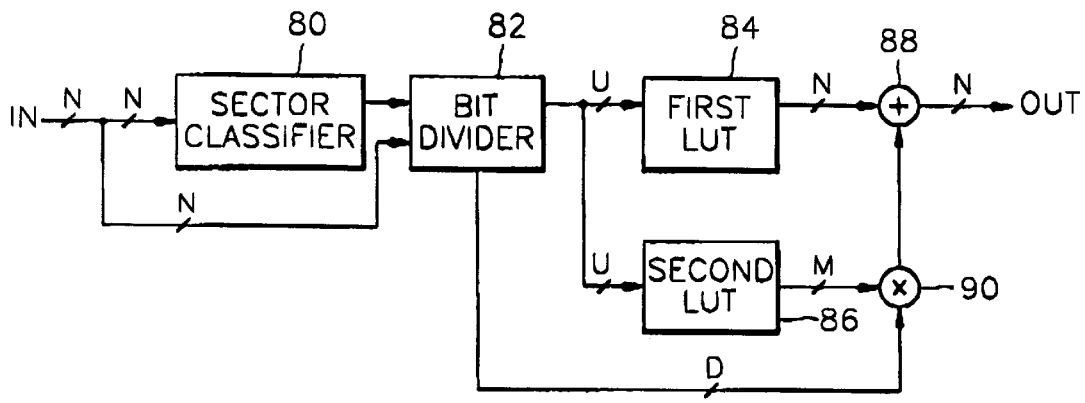
FIG. 7 is a block diagram of a non-linear characteristic correction apparatus according to yet another embodiment of the invention.

Generally, a precise digital corrected signal is more difficult to obtain through the interpolation in portions of correction curve 60 of FIG. 6 where the gradient is steep. Thus, the apparatus of FIG. 5 has a problem that the output signal has a greater error the slop of the correction curve is steep. FIG. 7 is a block diagram of an embodiment of a non-linear characteristic correction apparatus that addresses such the problem. The non-linear characteristic correction apparatus of FIG. 7 includes a sector classifier 80, a bit divider 82, first and second LUTs 84 and 86, a multiplier 90 and an adder 88.

Figure 8:
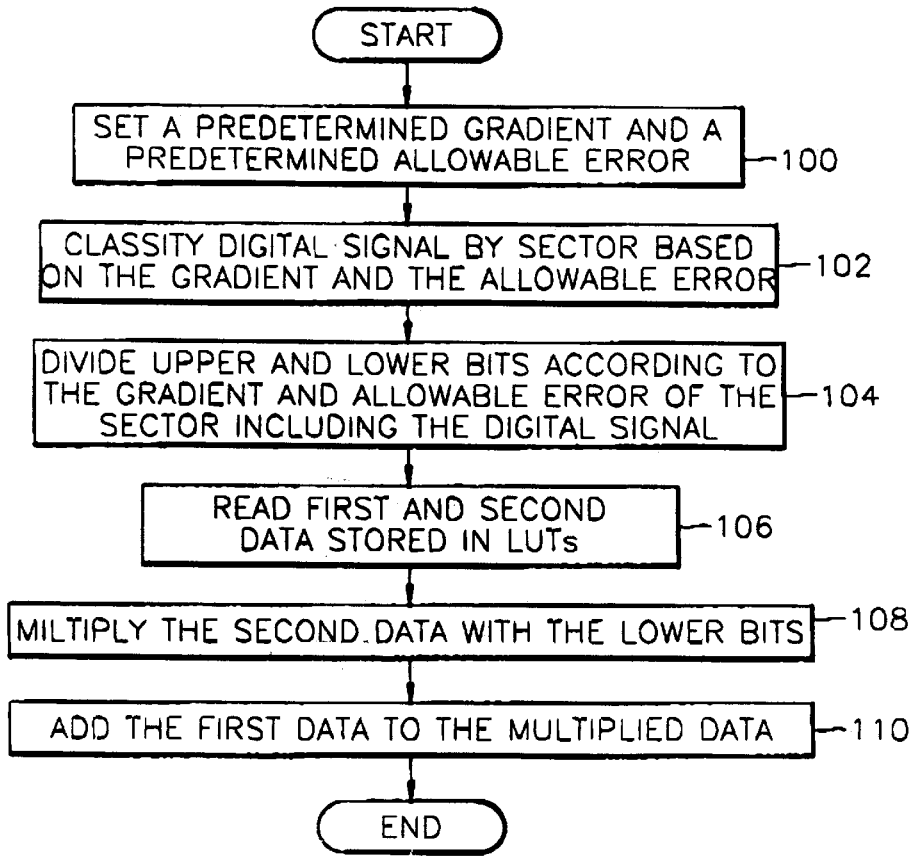
FIG. 8 is a flow chart illustrating a method for correcting non-linear characteristics using the apparatus of FIG. 7.

FIG. 8 is a flow chart illustrating a method for correcting non-linear characteristics using the apparatus of FIG. 7. The method for correcting non-linear characteristics includes steps 100, 102, and 104, which determine upper and lower bits of the digital input signal according to the gradient of the correction curve, and steps 106, 108, and 110 which calculate the digital corrected signals according to the upper and lower bits.

Figure 9:
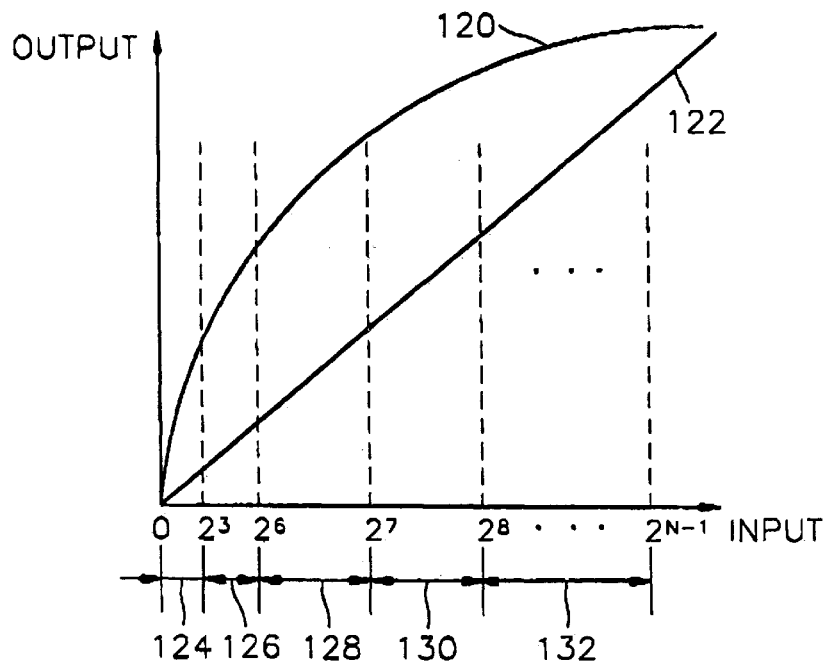
FIG. 9 is a graph illustrating the operation of the apparatus of FIG. 7.

FIG. 9 is a graph illustrating the operation of the apparatus of FIG. 7. In FIG. 9, the X-axis represents the N-bit digital input signal, and the Y-axis represents an output value. A line designated by reference numeral 122 represents input-output characteristics of a linear digital input signal whose gradient is equal to "1", and a line designated by reference numeral 120 represents input-output characteristics required in order to compensate for the non-linear characteristics of a system, that is, a correction curve.

Returning to FIG. 8, a predetermined gradient and a predetermined allowable error are set (step 100). After the step 100, sector classifier 80 shown in FIG. 7 the range from 0 to $2^{N-1}$ of input signal values into two or more sectors, based on the predetermined gradient and the predetermined allowable error. Sector classifier classifies an N-bit input signal as being in one of the sectors and outputs control signals indicating the respective sector to bit divider 82 (step 102). For example, sector classifier 80 classifies the sectors based on the predetermined gradient and error from the highest gradient to the lowest gradient in sequence, that is, first sector 124, second sector 126, third sector 128, fourth sector 130 and fifth sector 132. Here, the fifth sector 132 may be classified into a plurality of sectors.

After the step 102, bit divider 82 divides the N-bit digital input signal, input via the input port IN, into upper variable bits and lower variable bits in response to the control signal output from the sector classifier 80, and outputs the upper variable bits to the first and second LUTs 84 and 86 and the lower variable bits to the multiplier 90 (step 104). Here, bit divider 82 allocates more bits as the upper variable bits and fewer bits as the lower variable bits, when the digital input signal is in a sector having a high gradient. That is, signals in first sector 124 shown in FIG. 9 have the greatest number of upper bits, and those in fifth sector 132 have the least number of upper bits. LUTs 84 and 86 can contain independent sections for each sector of input signal values.

After step 104, the first and second data stored in the first and second LUTs 84 and 86 are read (step 106). That is, first LUT 84 of FIG. 7 stores the first data, which is described in regard to first LUT 20 shown in FIG. 2, and outputs first data to adder 88 in response to upper variable bits output from bit divider 82. Second LUT 86 stores the second data, which is described in regard to second LUT 22 of FIG. 2, and outputs the second data to multiplier 90 in response to the upper variable bits U.

After step 106, multiplier 90 multiplies the second data read from second LUT 86 with the lower bits, and outputs the product to adder 88 (step 108). After step 108, adder 88 adds the first data from first LUT 84 to the output from multiplier 90, and outputs the sum to an output port OUT as digital corrected data.

Unlike the apparatus of FIG. 2 or 3 which stores seed values with respect to digital input signal separated by the same interval, the above-described non-linear characteristic correction apparatus of FIG. 7 stores seed values with respect to digital input signals separated by different intervals, according to the gradient of the correction curve, instead of seed values with respect to input signals separated by the same interval, to obtain the digital corrected signal. As a result, the error at the portion of the correction curve having the steepest gradient can be reduced sharply, compared to the apparatuses of FIGS. 2 and 3.

Figure 10:
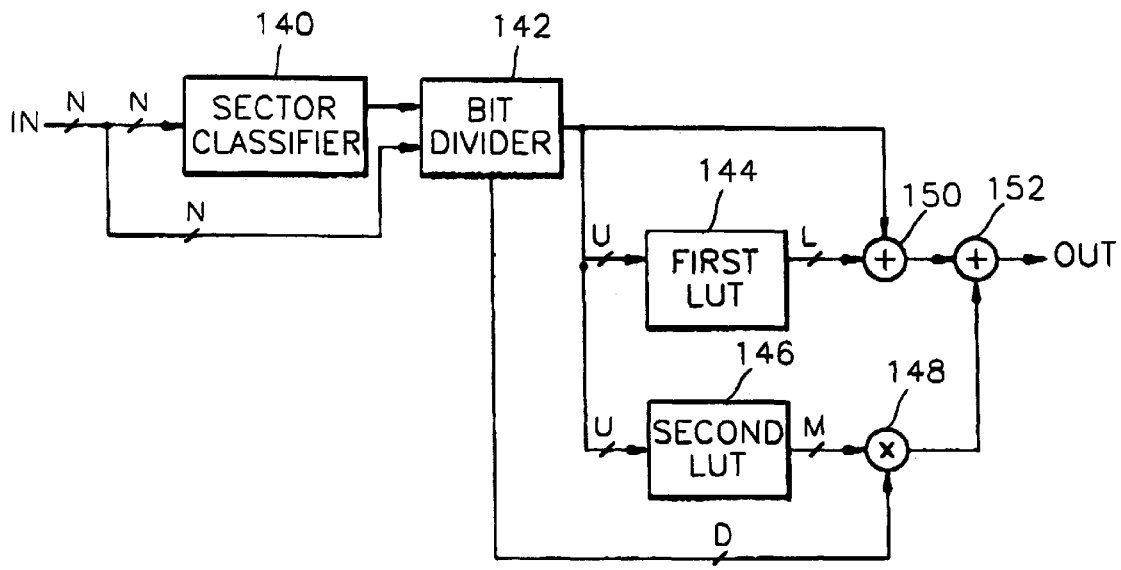
FIG. 10 is a block diagram of a non-linear characteristic correction apparatus according to a fourth embodiment of the present invention.
Figure 11:
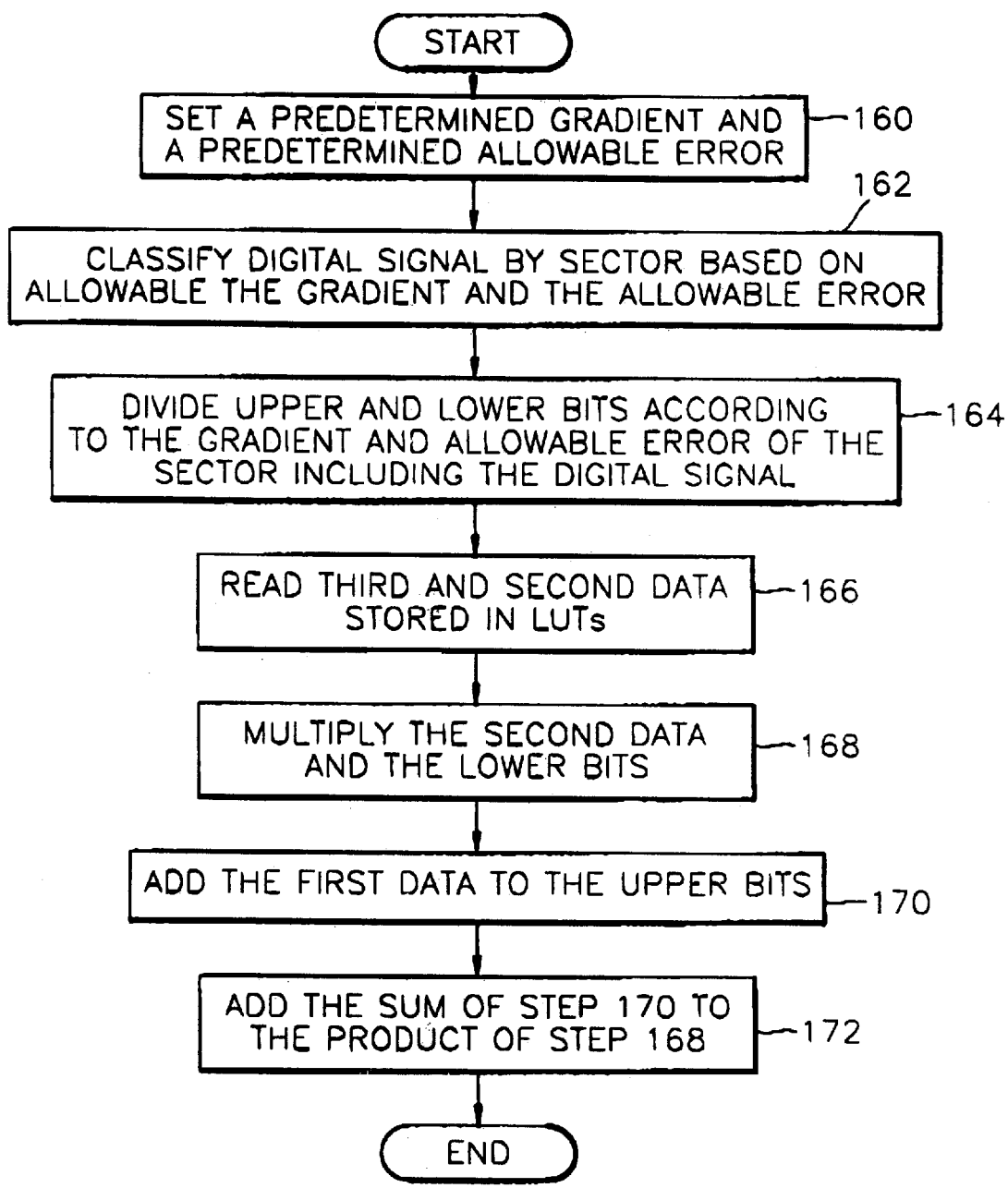
FIG. 11 is a flow chart illustrating a method for correcting non-linear characteristics using the apparatus of FIG. 10.

The structure and operation of a non-linear characteristic correction apparatus according to the invention, for reducing the width of first LUT 84 shown in FIG. 7, is described with reference to FIGS. 10 and 11. FIG. 10 is a block diagram of a non-linear characteristic correction apparatus according to yet another embodiment of the invention. The non-linear characteristic correction apparatus includes a sector classifier 140, a bit divider 142, first and second LUTs 144 and 146, a multiplier 148, and first and second adders 150 and 152. FIG. 11 is a flow chart illustrating a method for correcting non-linear characteristics using the apparatus of FIG. 10. The method for correcting non-linear characteristics includes steps 160, 162 and 164, which determine upper and lower bits of the digital input signal according to the gradient of the correction curve, and steps 166, 168, 170 and 172, which calculate the digital corrected signal according to the upper and lower bits.

In the method of FIG. 11, a predetermined gradient and a predetermined allowable error are set (step 160), the same as for the apparatus of FIG. 7. After step 160, the sector classifier 140 and the bit divider 142 of FIG. 10 perform the same functions as those of the sector classifier 80 and the bit divider 82 of FIG. 7. That is, the sector classifier 140 classifies the range of the digital input signal into two or more sectors, based on the predetermined gradient and the predetermined allowable error, and outputs control signals indicating the respective sectors to the bit divider 142 (step 162). The sector classification in the step 162 is performed by the same method as step 102 of FIG. 8.

After step 162, bit divider 142 divides the N-bit digital input signal, input via the input port IN. into upper variable bits U and lower variable bits D in response to the control signal output from sector classifier 140, and outputs the upper variable bits U to first and second LUTs 144 and 146 and first adder 150, and lower variable bits D to multiplier 148 (step 164). To achieve this, bit divider 142 allocates more bits as upper variable bits U and fewer bits to the lower variable bits D, when the digital input signal is in a sector having a high gradient. Step 164 is the same as the above-described step 104 of FIG. 8.

After step 164, the third and second data stored in first and second LUTs 144 and 146 are read (step 166). That is, first and second LUTs 144 and 146 of FIG. 10 store the third and second data which are as described in regard to first and second LUTs 50 and 52 shown in FIG. 5, and output the third and second data to first adder 150 and multiplier 148, respectively, in response to the upper bits U output from bit divider 142.

After step 166, multiplier 148 multiplies the second data from second LUT 146 with the lower variable bits D, and outputs the product to second adder 152 (step 168). First adder 150 adds the third data read from first LUT 144 to the upper variable bits U, and outputs the sum to second adder 152 (step 170). After step 170, second adder 152 adds the output from multiplier 148 to the output from first adder 150, and outputs the sum to an output port OUT, as a digital corrected signal (step 172).

Unlike the apparatus of FIG. 5, the above-described non-linear characteristic correction apparatus of FIG. 10 calculates the digital corrected signal using the difference between seed values with respect to digital input signal separated by different intervals, and the digital input signals, according to the gradient of the correction curve and the digital input signal, instead of the difference between seed values with respect to digital input signals separated by the same interval, and the digital input signals. As a result, the error at the portions of the correction curve having the steepest gradient can be reduced sharply, compared to the apparatus of FIG. 5. In addition, in the non-linear characteristic correction apparatus of FIG. 10, first LUT 144 stores difference values, unlike first LUT 84 of FIG. 7 which stores the digital corrected signals, so that the width of first LUT 144 can be further reduced.

The above-described multipliers 24, 34, 56, 90 and 148 shown in FIGS. 2, 3, 5, 7 and 10 may each include shift registers and an adder, and the multiplication results are truncated according to the resolution required for correcting the digital input signal.

The error of the apparatus of FIG. 10 and that of the apparatus of FIG. 5 are compared as follows.

The following assumptions are made. A 10-bit digital input signal is input via the respective input ports IN of the apparatuses of FIGS. 5 and 10, and 64 third and second data as shown in Table 1 are stored in the first and second LUTs of FIG. 5, respectively, under the assumption that the number of upper bits is equal to 6 and the number of lower bits is equal to 4. Mean while, 42 third and second data as shown in Table 2 are stored in first and second LUTs 144 and 146 of FIG. 10, and a predetermined allowable error of the apparatus shown in FIG. 10 equal to ±1.5 least significant bit (LSB). Here, ±1.5 LSB represents the range of error between the desired digital corrected signal with respect to the digital input signal, and the digital corrected signal actually output from the apparatus of FIG. 10.

TABLE 1

| THIRD DATA | | | | SECOND DATA | | | |
|---|---|---|---|---|---|---|---|
| ADDRESS | DATA | ADDRESS | DATA | ADDRESS | DATA | ADDRESS | DATA |
| 1 | 0 | 33 | 238 | 1 | 9.84 | 33 | 0.65 |
| 2 | 142 | 34 | 232 | 2 | 3.59 | 34 | 0.65 |
| 3 | 184 | 35 | 226 | 3 | 2.68 | 35 | 0.62 |
| 4 | 210 | 36 | 220 | 4 | 2.21 | 36 | 0.62 |
| 5 | 230 | 37 | 214 | 5 | 1.93 | 37 | 0.62 |
| 6 | 246 | 38 | 208 | 6 | 1.75 | 38 | 0.59 |
| 7 | 256 | 39 | 202 | 7 | 1.59 | 39 | 0.59 |
| 8 | 266 | 40 | 196 | 8 | 1.46 | 40 | 0.59 |
| 9 | 274 | 41 | 188 | 9 | 1.37 | 41 | 0.59 |
| 10 | 280 | 42 | 182 | 10 | 1.28 | 42 | 0.56 |
| 11 | 284 | 43 | 176 | 11 | 1.21 | 43 | 0.56 |
| 12 | 288 | 44 | 168 | 12 | 1.15 | 44 | 0.56 |
| 13 | 290 | 45 | 162 | 13 | 1.09 | 45 | 0.56 |
| 14 | 292 | 46 | 154 | 14 | 1.06 | 46 | 0.53 |
| 15 | 292 | 47 | 146 | 15 | 1.03 | 47 | 0.53 |
| 16 | 294 | 48 | 140 | 16 | 0.96 | 48 | 0.53 |
| 17 | 292 | 49 | 132 | 17 | 0.93 | 49 | 0.53 |
| 18 | 292 | 50 | 124 | 18 | 0.90 | 50 | 0.53 |
| 19 | 290 | 51 | 116 | 19 | 0.90 | 51 | 0.50 |
| 20 | 288 | 52 | 108 | 20 | 0.87 | 52 | 0.50 |
| 21 | 286 | 53 | 100 | 21 | 0.84 | 53 | 0.50 |
| 22 | 284 | 54 | 92 | 22 | 0.81 | 54 | 0.50 |
| 23 | 282 | 55 | 84 | 23 | 0.81 | 55 | 0.50 |
| 24 | 278 | 56 | 76 | 24 | 0.78 | 56 | 0.50 |
| 25 | 274 | 57 | 68 | 25 | 0.75 | 57 | 0.46 |
| 26 | 270 | 58 | 60 | 26 | 0.75 | 58 | 0.46 |
| 27 | 266 | 59 | 52 | 27 | 0.71 | 59 | 0.46 |
| 28 | 262 | 60 | 44 | 28 | 0.71 | 60 | 0.46 |
| 29 | 258 | 61 | 34 | 29 | 0.68 | 61 | 0.46 |
| 30 | 254 | 62 | 26 | 30 | 0.68 | 62 | 0.46 |
| 31 | 248 | 63 | 18 | 31 | 0.68 | 63 | 0.46 |
| 32 | 242 | 64 | 8 | 32 | 0.65 | 64 | 0.43 |

In this example, bit divider 142 of FIG. 10 allocates all 10 bits as the upper bits if the 10-bit digital input signal is in first sector 124 of FIG. 9, 8 bits as the upper bits and 2 bits as the lower bits if the input signal is in the second sector 126, 6 bits as the upper bits and 4 bits as the lower bits if the input signal is in third sector 128, 5 bits as the upper bits and 5 bits as th lower bits if the input signal exists in the fourth sector 130, and 4 bits as the upper bits and 6 bits as the lower bits if the input signal is in fifth sector 132.

TABLE 2

| THIRD DATA | | | | SECOND DATA | | | |
|---|---|---|---|---|---|---|---|
| ADDRESS | DATA | ADDRESS | DATA | ADDRESS | DATA | ADDRESS | DATA |
| 0 | 0 | 21 | 226 | 0 | 0 | 21 | 2.09 |
| 1 | 44 | 22 | 230 | 1 | 0 | 22 | 1.93 |
| 2 | 60 | 23 | 346 | 2 | 0 | 23 | 1.75 |
| 3 | 72 | 24 | 356 | 3 | 0 | 24 | 1.59 |
| 4 | 80 | 25 | 366 | 4 | 0 | 25 | 1.46 |
| 5 | 88 | 26 | 274 | 5 | 0 | 26 | 1.31 |
| 6 | 96 | 27 | 284 | 6 | 0 | 27 | 1.18 |
| 7 | 102 | 28 | 290 | 7 | 0 | 28 | 1.09 |
| 8 | 108 | 29 | 292 | 8 | 5.78 | 29 | 1 |
| 9 | 126 | 30 | 292 | 9 | 4.78 | 30 | 0.9 |
| 10 | 142 | 31 | 286 | 10 | 4.15 | 31 | 0.81 |
| 11 | 154 | 32 | 274 | 11 | 3.71 | 32 | 0.75 |
| 12 | 166 | 33 | 258 | 12 | 3.4 | 33 | 0.68 |
| 13 | 174 | 34 | 238 | 13 | 3.1 | 34 | 0.62 |
| 14 | 184 | 35 | 214 | 14 | 2.93 | 35 | 0.59 |
| 15 | 190 | 36 | 188 | 15 | 2.75 | 36 | 0.56 |
| 16 | 198 | 37 | 162 | 16 | 2.59 | 37 | 0.53 |
| 17 | 204 | 38 | 132 | 17 | 2.46 | 38 | 0.5 |
| 18 | 210 | 39 | 100 | 18 | 2.37 | 39 | 0.5 |
| 19 | 216 | 40 | 68 | 19 | 2.28 | 40 | 0.46 |
| 20 | 220 | 41 | 34 | 20 | 2.18 | 41 | 0.46 |

As shown in Table 2, addresses 0 through 7 of second LUT 146 store the gradient of 0. This means that the digital corrected signal with respect to the digital input signal of first sector 124 of FIG. 9 is obtained by a 1:1 mapping as in the conventional gamma correction apparatus, instead of using the gradient to approximate the corrected signal.

Figure 12:
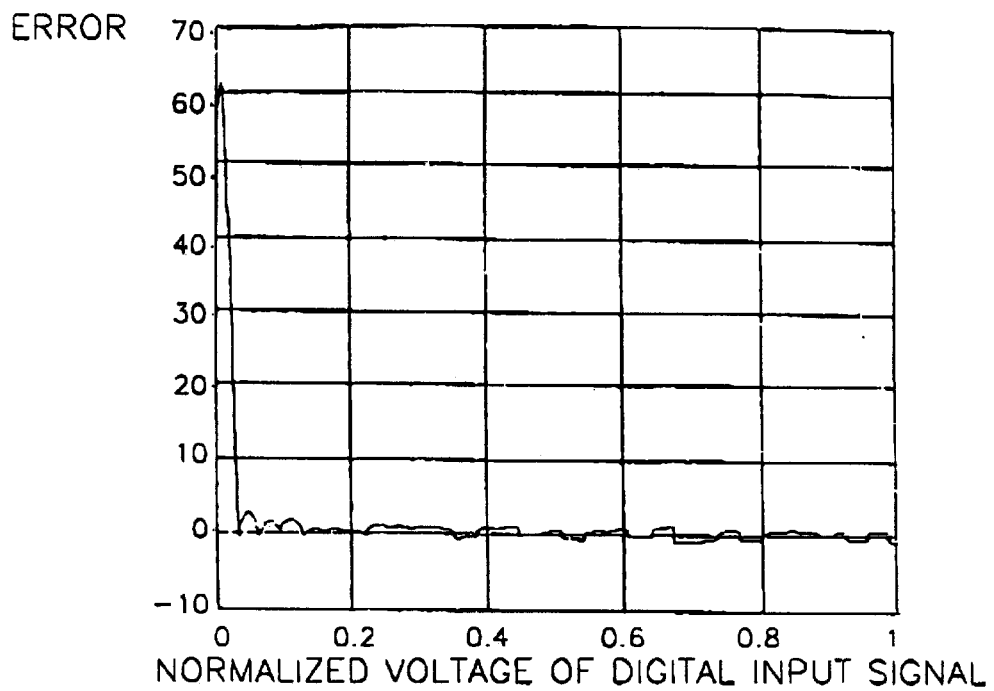
FIG. 12 is a graph showing the simulated value of the correction error of the apparatus of FIG. 5.
Figure 13:
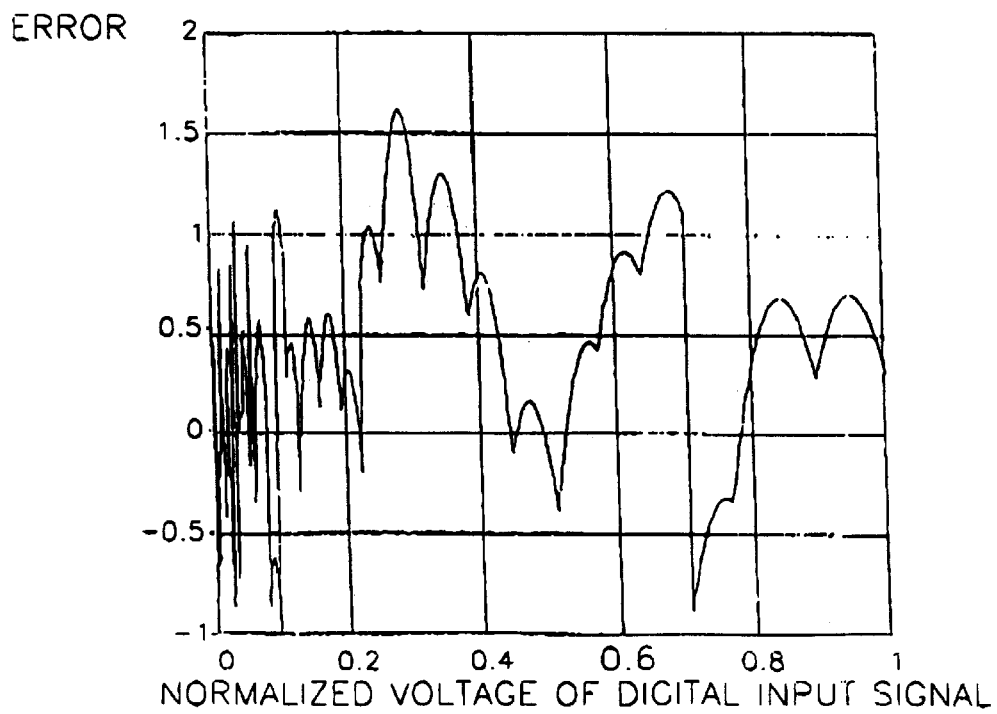
FIG. 13 is a graph showing the simulated values of the correction error of the apparatus of FIG. 10.

Assuming that the gradient of the correction curve is steeper in a portion having smaller values of the digital input signal as shown in FIG. 9, and the third and second data shown in Tables 1 and 2 are stored in LUTs, the errors of the apparatuses of FIGS. 5 and 10 can be simulated as shown in FIGS. 12 and 13.

FIG. 12 is a graph showing simulated values of the correction error of the apparatus of FIG. 5. Here, the X-axis represents a normalized voltage corresponding to the digital input signal, and the Y-axis represents the error between the desired digital corrected data and the digital corrected data actually output by the apparatus of FIG. 5.

FIG. 13 is a graph showing simulated values of the correction error of the apparatus of FIG 10. Here, the X-axis represents a normalized voltage corresponding to the digital input signal, and the Y-axis represents the error between the desired digital corrected data and the digital corrected data actually output by the apparatus of FIG. 10.

Referring to FIGS. 12 and 13, in the non-linear characteristic correction apparatus of FIG. 5, the error of the digital corrected signal is very large when the digital input signal is located in a sector where the gradient is steep, that is, in the first sector 124. Meanwhile, in the case of the non-linear characteristic correction apparatus of FIG. 10, the error of the digital corrected signal is within the range of ±1.5 LSB even in the sector where the gradient is steep.

As described above, the non-linear characteristic correction apparatus of FIG. 7 and the one of FIG. 10 selects the digital input signals in a narrow interval in sectors where the gradient of the correction curve is steep, and in a wide interval in sectors where the gradient of the curve is less, and stores the third data with respect to, thereby reducing the error.

As demonstrated with the non-linear characteristic correction apparatus of FIG. 2, the non-linear characteristic correction apparatuses of FIGS. 5, 7 and 10 can also be applied to gamma correction, and may process one color signal or concurrently process R, G, and B color signals using the multiplexers and the demultiplexers as shown in FIG. 3. In addition, the addressing method of the first and second LUTs can be programmable, using the structure shown in FIG. 3.

As described above, the non-linear characteristic correction apparatus and the method therefor according to the invention can significantly reduce the size of the LUTs compared to the conventional correction device. In addition, the digital corrected signal is adaptively output according to the gradient of the correction curve, thereby reducing th e error. Also, the non-linear characteristic correction apparatus can be applied to a gamma correction apparatus or any system having non-linear characteristics.

What is claimed is:

1. An apparatus for correcting non-linear characteristics of a system, comprising:

a first look up table for storing first data and outputting the stored first data by using the upper bits of an N-bit digital signal input to the system as an address;

a second look up table for storing second data and outputting the stored second data by using the upper bits of the digital signal as an address;

a multiplier for multiplying the second data, output from the second look up table, by the lower bits of the digital signal, and outputting the product; and an adder for adding the first data, output from the first look up table, to the product output from the multiplier, wherein the sum output by the adder is an N-bit digital corrected signal for compensating for the non-linear characteristics, used by the system instead of the N-bit digital signal, and the first data is a predetermined number of digital corrected signals, and the second data is the gradient of the digital corrected signal with respect to the gradient of the digital signal.

2. The apparatus of claim 1, wherein the N-bit digital signal is one of red (R), green (G) and blue (B) signals requiring gamma correction.

3. The apparatus of claim 1, wherein the apparatus further comprises:

a multiplexer for selecting one of red (R), green (G) and blue (B) color signals to be gamma-corrected in response to a system clock signal and frequency-divided system clock signal, and outputting the selected color signal as the N-bit digital signal to the first look up table, the second look up table and the multiplier; and a demultiplexer for outputting the output from the adder as gamma-corrected R', G' and B' signals, in response to the system clock signal and the frequency-divided system clock signal, wherein the color signals are concurrently gamma-corrected.

4. The apparatus of claim 2, wherein the non-linear characteristic correction apparatus is a gamma correction apparatus included in a transmitter for transmitting the color signals.

5. The apparatus of claim 2, wherein the non-linear characteristic correction apparatus is a gamma correction apparatus included in a receiver for receiving the color signals.

6. The apparatus of claim 1, wherein the first look up table is a writable/readable memory and can use a programmable addressing method.

7. The apparatus of claim 1, wherein the second look up table is a writable/readable memory and can use a programmable addressing method.

8. An apparatus for correcting non-linear characteristics of a system, comprising:

a first look up table for storing first data and outputting the stored first data by using the upper bits of an N-bit digital signal input to the system as an address;

a second look up table for storing second data and outputting the stored second data by using the upper bits of the digital signal as an address;

a multiplier for multiplying the second data, output from the second look up table, by the lower bits of the digital signal, and outputting the product;

a first adder for adding the first data, output from the first look up table, to the upper bits of the digital signal, and outputting the sum; and a second adder for adding the output from the multiplier to the output from the first adder, wherein the sum output by the second adder is an N-bit digital corrected signal for compensating for the non-linear characteristics, used by the system instead of the N-bit digital signal, and the first data is the difference between the digital corrected signal and the digital signal, and the second data is the gradient of the digital corrected signal with respect to the gradient of the digital signal.

9. The apparatus of claim 8, wherein the N-bit digital signal is one of red (R), green (G) and blue (B) signals requiring gamma correction.

10. The apparatus of claim 8, wherein the apparatus further comprises:
   a multiplexer for selecting one of red (R), green (G) and blue (B) color signals to be gamma-corrected in response to a system clock signal and frequency-divided system clock signal, and outputting the selected color signal as the N-bit digital signal to the first look up table, the second look up table and the multiplier; and
   a demultiplexer for outputting the output from the adder as gamma-corrected R', G', and B' signals, in response to the system clock signal and the frequency-divided system clock signal,
   wherein the color signals are concurrently gamma-corrected.

11. The apparatus of claim 9, wherein the non-linear characteristic correction apparatus is a gamma correction apparatus included in a transmitter for transmitting the color signals.

12. The apparatus of claim 9, wherein the non-linear characteristic correction apparatus is a gamma correction apparatus included in a receiver for receiving the color signals.

13. The apparatus of claim 8, wherein the first look up table is a writable/readable memory and can use a programmable addressing method.

14. The apparatus of claim 8, wherein the second look up table is a writable/readable memory and can use a programmable addressing method.

15. An apparatus for correcting non-linear characteristics of a system, comprising:
   a sector classifier for classifying range of an N-bit digital signal into two or more sectors, based on a predetermined gradient and a predetermined allowable error, and outputting a control signal indicating the respective sectors;
   a bit divider for dividing the N-bit digital signal into upper and lower bits in response to the control signal;
   a first look up table for storing first data and outputting the stored first data by using the upper bits as an address;
   a second look up table for storing second data and outputting the stored second data by using the upper bits as an address;
   a multiplier for multiplying the second data, output from the second look up table, by the lower bits, and outputting the product; and
   an adder for adding the first data, output from the first look up table, to the product output from the multiplier,
   wherein the sum output by the adder is an N-bit digital corrected signal for compensating for the non-linear characteristics, used by the system instead of the N-bit digital signal, and the first data is a predetermined number of digital corrected signals, and the second data is the gradient of the digital corrected signal with respect to the gradient of the digital signal, and the control signal is generated such that more bits of the digital signal are allocated as upper bits, in a sector having a steeper gradient.

16. The apparatus of claim 15, wherein the bit divider outputs the entire N-bit digital signal as upper bits when the digital signal is included in a sector having a predetermined level of gradient, in response to the control signal.

17. The apparatus of claim 15, wherein the N-bit digital signal, is one of red (R), green (G) and blue (B) signals requiring gamma correction.

18. The apparatus of claim 15, wherein the apparatus further comprises:
   a multiplexer for selecting one of red (R), green (G) and blue (B) color signals to be gamma-corrected in response to a system clock signal and frequency-divided system clock signal, and outputting the selected color signal as the N-bit digital signal to the sector classifier and the bit divider; and
   a demultiplexer for outputting the output from the adder as gamma-corrected R', G', and B' signals, in response to the system clock signal and the frequency-divided system clock signal,
   wherein the color signals are concurrently gamma-corrected.

19. The apparatus of claim 17, wherein the non-linear characteristic correction apparatus is a gamma correction apparatus included in a transmitter for transmitting the color signals.

20. The apparatus of claim 17, wherein the non-linear characteristic correction apparatus is a gamma correction apparatus included in a receiver for receiving the color signals.

21. The apparatus of claim 15, wherein the first look up table is a writable/readable memory and can use a programmable addressing method.

22. The apparatus of claim 15, wherein the second look up table is a writable/readable memory and can use a programmable addressing method.

23. An apparatus for correcting non-linear characteristics of a system, comprising:
   a sector classifier for classifying range of an N-bit digital signal into two or more sectors, based on a predetermined gradient and a predetermined allowable error, and outputting a control signal indicating the respective sectors;
   a bit divider for dividing the N-bit digital signal into upper and lower bits in response to the control signal;
   a first look up table for storing first data and outputting the stored first data by using the upper bits as an address;
   a second look up table for storing second data and outputting the stored second data by using the upper bits as an address;
   a multiplier for multiplying the second data, output from the second look up table, by the lower bits, and outputting the product;
   a first adder for adding the first data, output from the first look up table, to the upper bits, and outputting the sum; and
   a second adder for adding the output from the multiplier to the output from the first adder,
   wherein the sum output by the adder is an N-bit digital corrected signal for compensating for the non-linear characteristics, used by the system instead of the N-bit digital signal, and the first data is the difference between the digital corrected signal and the digital signal, and the second data is the gradient of the digital corrected signal with respect to the gradient of the digital signal, and the control signal is generated such that more bits of the digital signal are allocated as upper bits, in a sector having a steeper gradient.

24. The apparatus of claim 23, wherein the bit divider outputs the entire N-bit digital signal as upper bits when the digital signal is included in a sector having a predetermined level of gradient, in response to the control signal.

25. The apparatus of claim 23, wherein the N-bit digital signal is one of red (R), green (G) and blue (B) signals requiring gamma correction.

26. The apparatus of claim 23, wherein the apparatus further comprises:

a multiplexer for selecting one of red (R), green (G) and blue (B) color signals to be gamma-corrected in response to a system clock signal and frequency-divided system clock signal, and outputting the selected color signal as the N-bit digital signal to the sector classifier and the bit divider; and a demultiplexer for outputting the output from the adder as gamma-corrected R', G', and B' signals, in response to the system clock signal and the frequency-divided system clock signal, wherein the color signals are concurrently gamma-corrected.

27. The apparatus of claim 25, wherein the non-linear characteristic correction apparatus is a gamma correction apparatus included in a transmitter for transmitting the color signals.

28. The apparatus of claim 25, wherein the non-linear characteristic correction apparatus is a gamma correction apparatus included in a receiver for receiving the color signals.

29. The apparatus of claim 25, wherein the first look up table is a writable/readable memory and can use a programmable addressing method.

30. The apparatus of claim 25, wherein the second look up table is a writable/readable memory and can use a programmable addressing method.

31. A method for correcting non-linear characteristics of a system, using look up tables, the method comprising the steps of:

(a) setting a predetermined gradient and a predetermined allowable error;

(b) classifying range of an N-bit digital signal by sector, based on the predetermined gradient and the predetermined allowable error;

(c) dividing the N-bit digital signal into upper and lower bits, according to the gradient of the sector including the current digital signal to be corrected, and the predetermined allowable error;

(d) reading the first and second data stored in a look up table, according to the upper bits;

(e) multiplying the second data by the lower bits; and (f) adding the first data to the product of the multiplication, wherein the sum of the addition is an N-bit digital corrected signal for compensating for the non-linear characteristics, used by the system instead of the N-bit digital signal, and the first data is a predetermined number of digital corrected signals, and the second data is the gradient of the digital corrected signal with respect to the gradient of the digital signal, and the control signal is generated such that more bits of the digital signal are allocated as upper bits in a sector having a steeper gradient.

32. The method of claim 31, wherein in the step (c), the entire N-bit digital signal is divided as upper bits, when the gradient of the sector including the current N-bit digital signal to be corrected is greater than a predetermined level.

33. The method of claim 31, wherein the N-bit digital signal is one of red (R), green (G) and blue (B) signals requiring gamma correction.

34. The method of claim 31, wherein the method further comprises the steps of:

(g) selecting one of red (R), green (G) and blue (B) color signals to be gamma-corrected in response to a system clock signal and frequency-divided system clock signal, and performing the steps (a) through (f); and (h) determining the sum obtained in the step (f) as being one of gamma-corrected R', G', and B' signals, in response to the system clock signal and the frequency-divided system clock signal, wherein the color signals are concurrently gamma-corrected.

35. The method of claim 33, wherein the non-linear characteristic correction method is performed in a transmitter for transmitting the color signals.

36. The method of claim 33, wherein the non-linear characteristic correction method is performed in a receiver for receiving the color signals.

37. The method of claim 31, wherein the first data is written to/read from a look up table using a programmable addressing method.

38. The method of claim 31, wherein the second data is written to/read from a look up table using a programmable addressing method.

39. A method for correcting non-linear characteristics of a system, using look up tables, the method comprising the steps of:

(a) setting a predetermined gradient and a predetermined allowable error;

(b) classifying range of an N-bit digital signal by sector, based on the predetermined gradient and the predetermined allowable error;

(c) dividing the N-bit digital signal into upper and lower bits, according to the gradient of the sector including the current digital signal to be corrected, and the predetermined allowable error;

(d) reading the first and second data stored in a look up table, according to the upper bits;

(e) multiplying the second data by the lower bits;

(f) adding the first data to the upper bits; and (g) adding the sum of the addition of step (f) to the product of the multiplication, wherein the sum of the addition of step (g) is an N-bit digital corrected signal for compensating for the non-linear characteristics, used by the system instead of the N-bit digital signal, and the first data is the difference between the digital corrected signal and the digital signal, and the second data is the gradient of the digital corrected signal with respect to the gradient of the digital signal, and the control signal is generated such that more bits of the digital signal are allocated as upper bits in a sector having a steeper gradient.

40. The method of claim 39, wherein in the step (c), the entire N-bit digital signal is divided as upper bits, when the gradient of the sector including the current N-bit digital signal to be corrected is greater than a predetermined level.

41. The method of claim 39, wherein the N-bit digital signal is one of red (R), green (G) and blue (B) signals requiring gamma correction.

42. The method of claim 39, wherein the method further comprises the steps of:

(h) selecting one of red (R), green (G) and blue (B) color signals to be gamma-corrected in response to a system clock signal and frequency-divided system clock signal, and performing the steps (a) through (g); and (i) determining the sum obtained in the step (f) as being one of gamma-corrected R', G', and B' signals, in response to the system clock signal and the frequency-divided system clock signal, wherein the color signals are concurrently gamma-corrected.

43. The method of claim 41, wherein the non-linear characteristic correction method is performed in a transmitter for transmitting the color signals.

44. The method of claim 41, wherein the non-linear characteristic correction method is performed in a receiver for receiving the color signals.

45. The method of claim 39, wherein the first data is written to/read from a look up table using a programmable addressing method.

46. The method of claim 39, wherein the second data is written to/read from a look up table using a programmable addressing method.

* * * * *